United States Patent [19]

Diefenbach et al.

[11] 4,024,327
[45] May 17, 1977

[54] BAKING FINISHES WHICH DO NOT POLLUTE THE ENVIRONMENT

[75] Inventors: Horst Diefenbach, Ludwigshafen; Karl-Ludwig Platt, Mainz-Gonsenheim, both of Germany

[73] Assignee: BASF Aktiengesellschaft, Ludwigshafen, Germany

[22] Filed: July 12, 1976

[21] Appl. No.: 704,562

[30] Foreign Application Priority Data

Aug. 1, 1975 Germany .......................... 2534400

[52] U.S. Cl. .............................. 526/50; 260/17 R; 260/31.8 R; 260/31.8 E; 260/42.28; 260/42.31; 260/42.52; 427/27
[51] Int. Cl.² ........................................ C08F 8/30
[58] Field of Search ............... 526/50; 427/27; 260/17 R, 31.8 R, 31.8 E, 42.31, 42.28, 42.52

[56] References Cited

UNITED STATES PATENTS

| | | | |
|---|---|---|---|
| 2,386,427 | 10/1945 | Breck | 526/50 X |
| 3,935,138 | 1/1976 | Wingler et al. | 526/50 X |
| 3,954,719 | 5/1976 | Pirck et al. | 526/50 X |

*Primary Examiner*—William F. Hamrock
*Attorney, Agent, or Firm*—Keil, Thompson & Shurtleff

[57] ABSTRACT

Baking finishes which do not pollute the environment and which comprise a mixture of a polymer having hydroxyl groups, a furoxane of the formula

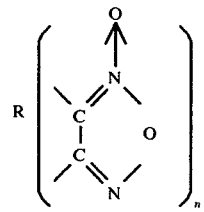

where R is a 2n-valent hydrocarbon radical of 2 to 20 carbon atoms and n is an integer from 1 to 4, and, if appropriate, suitable assistants.

6 Claims, No Drawings

BAKING FINISHES WHICH DO NOT POLLUTE THE ENVIRONMENT

The present invention relates to baking finishes which do not pollute the environment and are based on polymers containing hydroxyl groups and furoxanes as crosslinking components.

Heat-curing finishes conventionally contain solvents which are released during the baking process and pollute the environment. For some years, therefore, attempts have been made to develop water-based finishes or to employ systems of low solvent content (high solids systems) or systems which are free from solvent (spray powder).

The curing frequently utilizes the crosslinking of polymers, containing hydroxyl groups, with polyisocyanates. The coatings thus obtained, which are crosslinked by urethane links, are distinguished by excellent mechanical properties and excellent resistance to chemicals and to weathering.

Because of the high reactivity of the polyisocyanates, polyurethane finishes can in general only be used in the form of two-component systems. After the components have been mixed, the finishes must be processed rapidly, since they crosslink even at room temperature and thereby become unusable.

Spray powders cannot be used as two-component systems, since the mixture of 2 components in the powder form does not give homogeneous finishes. Hence, polyurethane powder finishes are formulated with blocked isocyanates, i.e. isocyanates produced by reaction with CH-acidic, NH-acidic or OH-acidic compounds. The blocked isocyanates are stable compounds at room temperature; on baking the finish, the blocking component is split off again and the isocyanate which is liberated is able to react in the conventional way.

Powder formulations based on polymers containing hydroxyl groups in combination with blocked isocyanates have been disclosed; they give coatings having good properties. However, it is a disadvantage of such powders that on baking the blocking component is liberated and pollutes the environment, and this disadvantage is all the greater since the blocking agents are in some cases toxic compounds, e.g. phenols, lactams, oximes or amines.

It is an object of the present invention to provide one-component polyurethane finishes in which the crosslinking component used is a compound which gives a polyisocyanate at elevated temperatures without another compound being split off at the same time.

We have found that this object is achieved with baking finishes comprising (A) polymers containing hydroxyl groups,
(B) a crosslinking component and
(C) if appropriate, assistants, e.g. solvents, dispersing agents, pigments, fillers, flow control agents, plasticizers or catalysts, wherein the crosslinking component B is a furoxane.

Polymers A, having hydroxyl groups, which can be used are acrylate resins, polyesters, epoxy resins, cellulose esters, cellulose ethers, partially hydrolyzed homopolymers and copolymers of vinyl esters, partially acetalized polyvinyl alcohols and the like. Polyacrylates and polyesters are preferred.

The hydroxyl number of the polymers to be used is as a rule from 40 to 200 and preferably from 60 to 120 mg of KOH/g. The molecular weight depends on the field of use; for use in spray powders it is from 4,000 to 10,000 and for use in high solids systems it is from 1,000 to 8,000. If the binders are used in spray powders the glass transition temperature should be from 40° to 90° C.

The acrylate resins are preferably copolymers of (a) from 50 to 30 percent by weight of monoesters of acrylic acid or methacrylic acid with dihydric or polyhydric alcohols, e.g. 1,4-butanediol monoacrylate, hydroxypropyl acrylate or methacrylate, diethylene glycol monoacrylate and hydroxyethyl acrylate and methacrylate, or vinyl-glycol, vinylthioethanol, allyl alcohol or 1,4-butanediol monovinyl ether, (b) from 70 to 95 percent by weight of esters of acrylic acid or methacrylic acid with monohydric alcohols of 1 to 12 carbon atoms, e.g. methyl methyacrylate, ethyl acrylate, n-butyl acrylate or 2-ethylhexyl acrylate, (c) from 0 to 50 percent by weight of aromatic vinyl compounds, e.g. styrene, -methylstyrene or vinyl toluene, and (d) from 0 to 20 percent by weight of other monomers having functional groups, e.g. acrylic acid, methacrylic acid, crotonic acid itaconic acid, maleic acid, fumaric acid, maleic anhydride, maleic acid half-esters, acrylamide, methacrylamide, acrylonitrile, N-methylolacrylamide and N-methylolmethacrylamide.

The acrylate resins can be manufactured by conventional methods, i.e. by solution polymerization, suspension polymerization, emulsion polymerization or precipitation polymerization, or, preferably, by bulk polymerization. The polymerization initiators used are the conventional peroxides or azo compounds, e.g. dibenzoyl peroxide, tert.butyl perbenzoate or azodiisobutyronitrile. The molecular weight can be regulated, e.g. with sulfur compounds, such as tert.-dodecylmercaptan.

The polyesters are manufactured from (a) monohydric to hexahydric, preferably dihydric or trihydric alcohols, e.g. ethylene glycol, 1,2-propylene glycol, 1,4-butanediol, neopentyl glycol, hydroxypivalic acid neopentyl glycol ester or trimethylolpropane and (b) mono-, di-, tri- and tetra-carboxylic acids, their esters or anhydrides, e.g. pelargonic acid, adipic acid, phthalic acid, isophthalic acid, terephthalic acid, dimethyl terephthalate or trimellitic anhydride.

The polyesters are manufactured by conventional methods of melt polycondensation.

The crosslinking components present in the baking finishes of the invention are linear or cyclic furoxanes suitably of the general formula

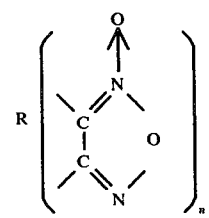

where R is a 2n-valent aliphatic, aromatic, cycloaliphatic, araliphatic or alicyclic hydrocarbon radical of 2 to 20 carbon atoms, which may be unsubstituted or substituted, and $n$ is an integer from 1 to 4.

Because of their great stability, cyclic furoxanes are preferred.

Furoxanes can easily be manufactured from the corresponding cycloolefins, as described, e.g., by H. Wieland, Liebig's Annalen der Chemie 329 (1903), 239, or in German Laid-Open Application DOS 2,336,403. The cycloolefin is reacted with dinitrogen trioxide or a mixture of nitric oxide and air, in a solvent of low polarity, at about 0° C, to give a pseudonitrosite. Rearrangement of the latter gives a nitroxime, which is dehydrated to the furoxane in a dehydrating medium such as sulfuric acid or polyphosphoric acid. Frequently, it is even possible to convert the pseudo-nitrosite directly to the furoxane by means of sulfuric acid. A different method of preparation starts from cyclic 1,2-diketones which are converted to the 1,2-dioximes, dehydrogenation of which gives furoxanes. The first-mentioned method of preparation is preferred because of the easy accessibility of the corresponding cycloolefins. Starting materials for the preparation of furoxanes by this method are monocyclic olefins, e.g. cyclopentene, cyclohexene, cycloheptene, cyclooctene, cyclopentadiene, cyclooctatetraene, bicyclic olefins, such as norbornene, tricyclic olefins, e.g. dicyclopentadiene and hexachlorodicyclopentadiene, partially hydrogenated aromatic hydrocarbons, e.g. 1,4-dihydronaphthalene or 1,2-dihydronaphthalene, and aromatic hydrocarbons which contain double bonds of olefinic character, e.g. indene, acenaphthene and phenanthrene. Numerous compounds from the terpene group can also be used for the preparation of furoxanes, e.g. pyrones, bornylene or caphorquinone. A plurality of possible starting materials for the preparation of furoxanes is also obtainable by a Diels-Alder diene synthesis.

It is also possible to use compounds which contain more than one furoxane ring in the molecule and which are thus derived, e.g., from 1,5-cyclooctadiene or dicyclopentadiene.

Examples of preferred furoxanes are those based on cyclohexene, cyclooctene, cyclopentadiene, dicyclopentadiene, indene, acenaphthene, phenanthrene, norbornene, bornylene and 1,4-dihydronaphthalene.

Depending on the nature of the substituent R, the furoxanes are fluid or solid, crystalline compounds which are completely stable at room temperature but dissociate at higher temperatures to the corresponding nitrile-oxides, from which polyisocyanates are formed by intramolecular rearrangement. The decomposition temperature of the furoxanes is from 80° to 250° C and preferably from 100° to 220° C, and depends on the substituents. Accordingly, aliphatic, cycloaliphatic, araliphatic or aromatic diisocyanates can be formed when furoxanes decompose.

In general, the furoxanes are combined in approximately equivalent amounts with the polymers containing hydroxyl groups (that is to say so that the hydroxyl groups and the isocyanate groups formed are present in equivalent amounts), but the molar ratio of furoxane groups to hydroxyl groups can vary between the limits 0.5 – 1.2:1.7 – 2.3.

The assistants which may be present in the baking finishes of the invention include the conventional solvents for surface coatings, such as esters, ketones and aromatics, e.g. butyl acetate, ethylglycol acetate, methyl ethyl ketone or toluene. Solvents with active hydrogen atoms, e.g. alcohols or glycols, should be avoided, since they may react with the isocyanate produced during baking. An exception is water which can be used as the solvent or diluent in the case of the furoxanes which decompose above 120° C. The furoxanes of the invention can thus also be employed in aqueous baking finishes. In special cases, e.g. in the case of fluid high solids finishes it is desirable that the solvent should become wholly or partially incorporated chemically into the crosslinked finish formed on baking. In the case of the baking finishes of the invention this is achieved by using reactive thinners, e.g. glycol monoethers or glycol monoesters.

Colorants which can be used in the baking finishes of the invention are the inorganic or organic pigments and dyes conventionally used in solvent-based finishes. Examples which may be mentioned are titanium dioxide, iron oxides, chromium oxide, carbon black, aluminum bronze or copper bronze, phthalocyanine pigments and azo pigments. In addition to pigments or dyes, fillers, e.g. talc, kaolin or china clay, may be used.

A plurality of substances may be used as catalysts. They include tertiary amines, e.g. 1,4-diaza(2,2,2)bicyclooctane, tertiary phosphines, e.g. triphenylphosphine, quaternary ammonium salts, e.g. tetrabutylammonium iodide, metal salts of carboxylic acids, e.g. potassium stearate, tin octoate and dibutyl-tin dilaurate, metal acetylacetonates, e.g. zinc acetylacetonate, sulfur compounds, e.g. 2-mercaptobenzthiazole, tetramethylthiuram disulfide and N,N'-diphenylthiourea, strong organic acids, e.g. p-toluenesulfonic acid and trichloroacetic acid, and latent acids, e.g. p-toluenesulfonic acid esters and phosphoric acid esters. In general, the catalysts are used in amounts of from 0.01 to 2 percent by weight.

The assistants to be used in the baking finishes of the invention also include substances for improving flow and avoiding surface irregularities, e.g. silicone oils and fluid acrylate resins.

To produce the fluid finishes, the components are milled in ball mills or on roll mills, in order to disperse the pigment, until optimum color strength is achieved.

In the case of powders, homogenization is carried out in the melt in a kneader or extruder. After cooling, the finish melt is milled and brought to a particle size of from 5 to 100 $\mu$, preferably from 10 to 90 $\mu$, by sieving.

Fluid finishes are applied by brushing, spraying, dipping or casting and powder finishes are applied by electrostatic spraying.

Examples or substrates suitable for coating with the baking finishes of the invention are glass, ceramic, concrete, wood, plastic and, preferably metal, e.g. iron or aluminum.

To cure the finishes, to coated articles are heated in through-circulation dryers at the appropriate temperature, until adequate crosslinking has taken place.

The baking temperature depends on the dissociation temperature of the furoxane used and is from 100° to 220° C and preferably from 120° to 200° C.

EXAMPLE 1 a. Preparation of 3,4-cyclooctenofuroxane 100 parts of cyclooctene in a mixture of 200 parts of hexane and 200 parts of diethyl ether are reacted with dinitrogen trioxide at −10° C, whilst stirring. 1-Nitroso-2-nitrocyclooctane (melting point 114° C) precipitates as a pale yellow powder in a yield of 70%, and is filtered off and dried.

1-Nitroso-2-nitrocyclooctane, in a three-fold amount of dioxane, is heated for 2 hours under nitrogen at 100° C, whilst stirring. After removing the solvent on a rotary evaporator, 2-nitro-cyclooctan-1-one-oxime is obtained, in quantitative yield, as a brown oil.

2-Nitro-cyclooctan-1-one-oxime is dissolved in a two-fold amount of concentrated sulfuric acid whilst cooling with ice, and the solution is heated at 125° C for 15 minutes. On pouring the reaction solution into ice water, a brown substance precipitates and is isolated by extraction with ether. The ether solution is washed with sodium bicarbonate solution and with water and dried over sodium sulfate, and the ether is removed on a rotary evaporator.

3,4-Cyclooctenofuroxane is obtained as a light-colored oil which solidifies to crystals on cooling.

Yield: 50% of theory; melting point 35° C; soluble in the conventional solvents for surface coatings.

b. Preparation of a solvent-based finish 440 parts of an acrylic resin solution (prepared by polymerizing a mixture of 336 parts of 1,4-butanediol monoacrylate, 672 parts of styrene, 504 parts of methyl methacrylate, 168 parts of n-butyl acrylate, 33.6 parts of azo-bis-isobutyronitrile, 26.8 parts of tert.-dodecyl-mercaptan and 720 parts of ethylglycol acetate), 36 parts of 3,4-cyclooctenofuroxane, 18 parts of a reaction product of bisphenol-A and epichlorohydrin, having an epoxide equivalent weight of 900, 8 parts of a polyacrylic acid n-butyl ester having a K value (determined by the Fikentscher method) of 35, 240 parts of a titanium dioxide pigment and 257 parts of triglycol acetate are milled in a ball mill until an optimum degree of dispersion is reached.

Steel sheets are coated with the resulting finish and baked for 30 minutes at 200° C.

Very glossy coatings are obtained, which are resistant to dilute acids and alkalis and have excellent resistance to climatic conditions when exposed to weathering in the open.

EXAMPLE 2 a. Preparation of bornyleno-2′,3′:3,4-furoxane

The pseudo-nitrosite is prepared from bornylene by addition reaction of dinitrogen trioxide, using the method described in Example 1(a). The pseudo-nitrosite is rearranged, in dioxane, to give the nitroxime, from which bornylene-2′,3′:3,4-furoxane (melting point 144° C) is produced in 60 percent yield by elimination of water in concentrated sulfuric acid after working up as described in Example 1(a).

b. Preparation of a powder finish 250 parts of an acrylic resin (prepared from 280 parts of hydroxypropyl acrylate, 340 parts of styrene, 300 parts of methyl methacrylate, 70 parts of n-butyl acrylate and 10 parts of acrylic acid) having a K value (determined by the Fikentscher method) of 23, a hydroxyl number of 122 mg of KOH/g, an acid number of 10 mg of KOH/g and a softening point (determined by the method of Kramer, Sarnow and Nagel) of 98° C are mixed with 35 parts of bornyleno-2′,3′:3,4-furoxane, 15 parts of a reaction product of bisphenol A and epichlorohydrin having an epoxide equivalent weight of 900, 3 parts of a polyacrylic acid n-butyl ester having a K value (determined by the Fikentscher method) of 35 and 200 parts of a titanium dioxide pigment, and the mixture is homogenized in the melt, at 90° C, in a kneader.

The resulting product is brought to a particle size of <90μ by milling and sieving and is sprayed electrostatically, using a voltage of 90 kV, onto steel sheets. The finish is baked for 30 minutes at 180° C.

Very glossy surface coatings which exhibit good levelling and have a hardness (by the method of DIN 53,157) of 186 seconds and an Erichsen cupping value (by the method of DIN 53,156) of 6 mm are obtained.

The coatings exhibit good resistance to solvents and chemicals and excellent resistance to yellowing.

EXAMPLE 3

A phenanthrenofuroxane prepared by the method described in Example 1a from phenanthrene (instead of cyclooctane) and dinitrogen trioxide was processed with the acrylic resin solution mentioned in Example 1b, and the assistants referred to in the same Example, to give a finish. This finish was applied to steel sheets which, after baking, gave very glossy coatings which had good resistance to chemicals.

EXAMPLE 4

226 parts of a polyester (prepared from 230 parts of isophthalic acid, 48.5 parts of pelargonic acid, 306 parts of propylene glycol and 356 parts of trimellitic anhydride) having a K value of 14 (measured in a 2% strength solution in dimethylformamide), a hydroxyl number of 64, an acid number of 113 and a glass transition temperature of 55° C are mixed with 19 parts of bornyleno-2′,3′:3,4-furoxane and the assistants indicated in Example 2(b) and the mixture is processed to give a powder finish.

The latter is applied electrostatically to steel sheets and baked for 30 minutes at 190° C to give a coating which exhibits great hardness, good levelling, good gloss and excellent resistance to yellowing.

We claim:

1. A baking finish which does not pollute the environment and which comprises a mixture of
   a. a polymer containing hydroxyl groups,
   b. a crosslinking component and, if appropriate
   c. one or more assistants from the group comprising solvents, dispersing agents, pigments, fillers, flow control agents, plasticizers and catalysts, wherein the crosslinking component is a furoxane of the formula

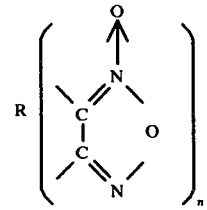

where
R is a 2n-valent aliphatic, aromatic, cycloaliphatic, araliphatic or alicyclic hydrocarbon radial of 2 to 20 carbon atoms, which may be unsubstituted or substituted, and n is an integer from 1 to 4.

2. A baking finish, which does not pollute the environment, as claimed in claim 1, wherein the polymer containing hydroxyl groups is an acrylate resin having a hydroxyl number of from 40 to 200 mg of KOH/g.

3. A baking finish, which does not pollute the environment, as claimed in claim 1, wherein the polymer containing hydroxyl groups is a polyester having a hydroxyl number of from 40 to 200 mg of KOH/g.

4. A baking finish, which does not pollute the environment, as claimed in claim 1, wherein a furoxane manufactured from a cyclic compound from the group comprising cyclohexene, cyclooctene, cyclopentadiene, cyclooctatetraene, norbornene, bornylene, phenanthrene and 1,4-dihydronaphthalene is used.

5. A process for the surface coating of articles, wherein the baking finish, which does not pollute the environment, as claimed in claim 1, is applied as a fluid high solids finish onto the article to be coated and is baked at from 100° to 220° C.

6. A process for the surface coating of articles, wherein the baking finish, which does not pollute the environment, as claimed in claim 1, is applied as a spray powder onto the article to be coated and is baked at from 100° to 200° C.

* * * * *